United States Patent
Jiang

(10) Patent No.: US 8,755,642 B2
(45) Date of Patent: *Jun. 17, 2014

(54) FIBER-AMPLIFIERS WITH ALL-FIBER OPTICAL ISOLATOR

(71) Applicant: AdValue Photonics, Inc., Tucson, AZ (US)

(72) Inventor: Shibin Jiang, Tucson, AZ (US)

(73) Assignee: AdValue Photonics, Inc., Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/964,364

(22) Filed: Aug. 12, 2013

(65) Prior Publication Data

US 2013/0329280 A1 Dec. 12, 2013

Related U.S. Application Data

(63) Continuation-in-part of application No. 13/708,787, filed on Dec. 7, 2012, now Pat. No. 8,509,574, which is a continuation-in-part of application No. 13/172,623, filed on Jun. 29, 2011, which is a continuation-in-part of application No. 12/778,712, filed on May 12, 2010, now Pat. No. 8,374,468, which is a continuation-in-part of application No. 12/628,914, filed on Dec. 1, 2009, now Pat. No. 8,346,029.

(51) Int. Cl.
  *G02B 6/00* (2006.01)

(52) U.S. Cl.
  USPC .............................. 385/11; 385/142; 385/144

(58) Field of Classification Search
  None
  See application file for complete search history.

(56) References Cited

U.S. PATENT DOCUMENTS

| | | | | |
|---|---|---|---|---|
| 3,756,690 | A * | 9/1973 | Borrelli et al. | 385/1 |
| 3,935,020 | A * | 1/1976 | Deeg et al. | 501/51 |
| 5,087,984 | A * | 2/1992 | Heiney et al. | 359/282 |
| 5,400,418 | A * | 3/1995 | Pearson et al. | 385/11 |
| 7,715,094 | B2 * | 5/2010 | Tokura et al. | 359/341.5 |
| 7,951,735 | B2 * | 5/2011 | Weber et al. | 501/73 |
| 2005/0225815 | A1 * | 10/2005 | Patel et al. | 359/1 |
| 2005/0225839 | A1 * | 10/2005 | Patel et al. | 359/333 |

* cited by examiner

*Primary Examiner* — Uyen Chau N Le
*Assistant Examiner* — Chris Chu
(74) *Attorney, Agent, or Firm* — Yakov Sidorin; Quarles & Brady LLP

(57) ABSTRACT

Fiber-amplifier device the light-path of which is devoid of a free-space element. The system device an all-fiber-optic Faraday rotator and isolator. The device has a multicomponent glass optical fiber having a core having a first doping concentration of 55%-85% (wt./wt.) of a first rare-earth oxide and a the isolator includes at least three magnetic cells with throughout bores hosting an optical fiber, the same magnetic poles of two immediately neighboring cells facing each other. The first rare-earth oxide includes one or more of $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $La_2O_3$, $Ga_2O_3$, $Ce_2O_3$, and $Lu_2O_3$.

12 Claims, 13 Drawing Sheets

FIG. 9
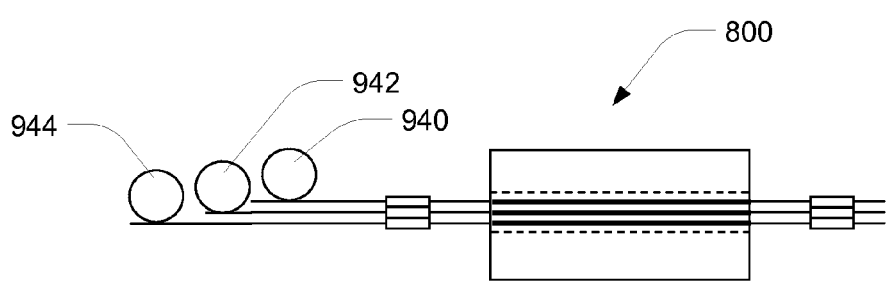
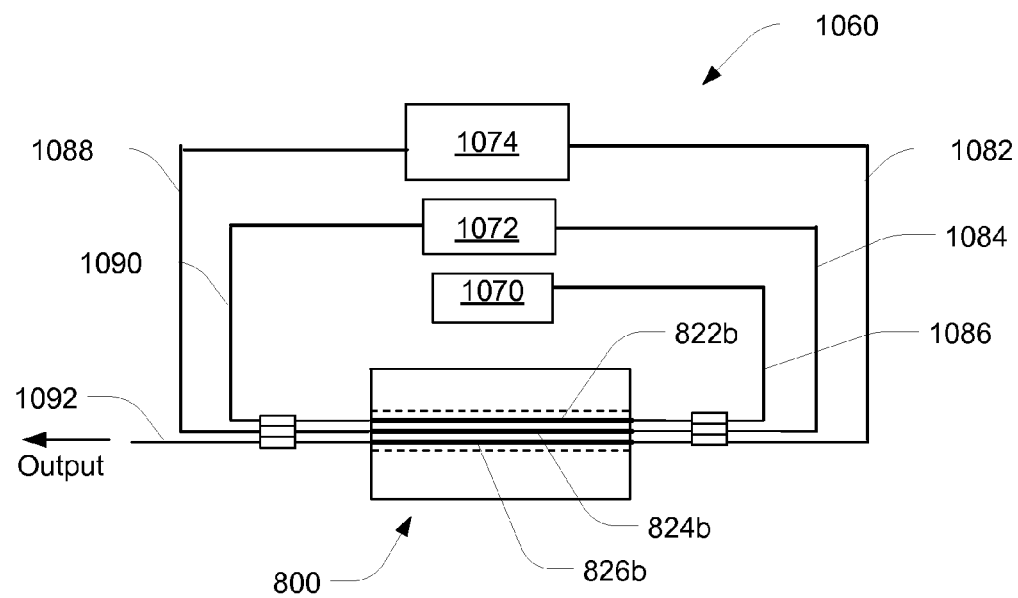
FIG. 10

FIBER-AMPLIFIERS WITH ALL-FIBER OPTICAL ISOLATOR

CROSS REFERENCE TO RELATED APPLICATIONS

This application is a Continuation-In-Part of U.S. patent application Ser. No. 13/708,787, filed Dec. 7, 2012, titled "Faraday Rotator and Isolator" and published as U.S. 2013/0129272, which is a Continuation-In-Part of U.S. patent application Ser. No. 13/172,623, filed Jun. 29, 2011 and titled "All Fiber Optical Isolator," now published as U.S. 2011/0261454; which, in turn, is a Continuation-In-Part of U.S. patent application Ser. No. 12/778,712, filed May 12, 2010 and titled "Highly Rare-Earth Doped Fiber Array," now U.S. Pat. No. 8,374,468; which is a Continuation-In-Part of U.S. patent application Ser. No. 12/628,914, filed Dec. 1, 2009 and titled "Highly Rare Earth Doped Fiber" issued as U.S. Pat. No. 8,346,029. The present application claims priority from and benefit of the above-mentioned applications under 35 U.S.C. §120. Disclosure of each of the above-identified patent application is incorporated herein by reference, for all purposes.

TECHNICAL FIELD

The present invention relates generally to a fiber amplifier employing all-fiber optical isolators and, in particular, to such fiber-optic based Faraday rotators and, more particularly, to high-power fiber amplifier systems.

SUMMARY OF THE INVENTION

Embodiments of the present invention provide a fiber-optic (FO) amplifier having input and output and including at least one first optical fiber the material composition of which of the first optical fiber is chosen to enable amplification of light passing therethrough. In one embodiment, the fiber amplifier includes at least one pump laser source.

An embodiment of the invention additionally includes (i) at least one all-fiber optical isolator employing a second optical fiber with at least first, second, and third separated from one another sections. The first and third sections of the second optical fiber are associated with Faraday rotation and have respective cores with a first doping concentration of 55%-85% (wt./wt.) of a first rare-earth oxide. An embodiment also includes at least three magnetic cells each having a hollow therethough (for example, an axial bore). These three or more magnetic cells are arranged in a sequence such that the same magnetic poles of immediately neighboring cells are facing one another. The first, and third sections of the second optical fiber are respectively disposed in the axial hollows of the first and third magnetic cells that are separated by a second magnetic cell.

The light-path defined by the embodiment of the FO-device between the input and the output is devoid of a free-space region, thereby enabling an all-fiber structure of the device. In one implementation, the immediately neighboring fiber-optic elements of the embodiment are fusion-spliced together. In a specific embodiment, the second optical fiber of the FO-device includes a multicomponent glass optical fiber and the first rare-earth oxide is selected from the group consisting of Pr2O3, Nd2O3, Pm2O3, Sm2O3, Eu2O3, Gd2O3, Tb2O3, Dy2O3, Ho2O3, Er2O3, Tm2O3, Yb2O3, La2O3, Ga2O3, Ce2O3, and Lu2O3. The second optical fiber includes a cladding optionally having a second doping concentration of 55%-85% (wt./wt.) of a second rare-earth oxide such as at least one of Pr2O3, Nd2O3, Pm2O3, Sm2O3, Eu2O3, Gd2O3, Tb2O3, Dy2O3, Ho2O3, Er2O3, Tm2O3, Yb2O3, La2O3, Ga2O3, Ce2O3, and Lu2O3. The refractive index of the cladding is lower than the refractive index of the core.

BRIEF DESCRIPTION OF THE DRAWINGS

Implementations of the invention will become more apparent from the detailed description set forth below when taken in conjunction with the drawings, in which like elements bear like reference numerals.

FIGS. 8, 9, 10, 11, and 12 show various sub-systems of an embodiment of the present invention;

DETAILED DESCRIPTION

Embodiments of the present invention address fiber laser and fiber amplifier systems that employ an all-fiber isolator in order to enable the operation at output power levels larger than about 100 W average power levels to which the performance of the conventionally structured fiber laser and fiber amplifier systems (employing a bulk Faraday-rotator-based optical isolator) is limited. For the purposes of the following disclosure and the appended claims, the term "significantly exceeding" generally refers to as defining a fiber-laser's or a fiber-amplifier's output power level in excess of 100 W average power or, alternatively or in addition, an output power with a peak power in excess of 5 kW. In contradistinction, the output average power levels of the fiber laser and/or power amplifier of the related art is substantially limited to less than 50 W. When the output power of the fiber amplifier (or the fiber laser system) of the related art is higher than this level of 50 W, the system of the related art is not used with a fiber pigtailed isolator at the output end thereof, utilizing instead a free-space optical isolator (for the reasons alluded to and explained below), which is big and not reliable in operation. In some specific cases, the devices of related art are using no optical isolator at all at the output average power levels exceeding about 50 W. When this is the case, the operation of the laser is extremely susceptible to optical feedback. Specifically, a back reflection might damage the fiber amplifier/laser) and, therefore, handling of the fiber-laser (and/or fiber amplifier) becomes non-trivial.

Optical-fiber-based lasers and amplifiers have attracted a significant amount of attention in the last decade because of their operational advantages over conventionally-used solid-state free-space lasers. By virtue of being generated and propagated in the core of the optical fiber, light produced by the optical fiber laser and/or amplifier can be easily delivered at a distance with the use of a flexible fiber optic element. Fiber lasers and amplifiers can be packaged compactly, with a small foot-print, because the fiber can be bent and coiled to save space. The optical fiber used for such purposes can be a strictly single-mode fiber, if needed, to ensure the diffraction-limited quality of the output beam of light. Fiber lasers exhibit high operational stability under vibration and maintenance-free turn-key operation.

Figure 1:
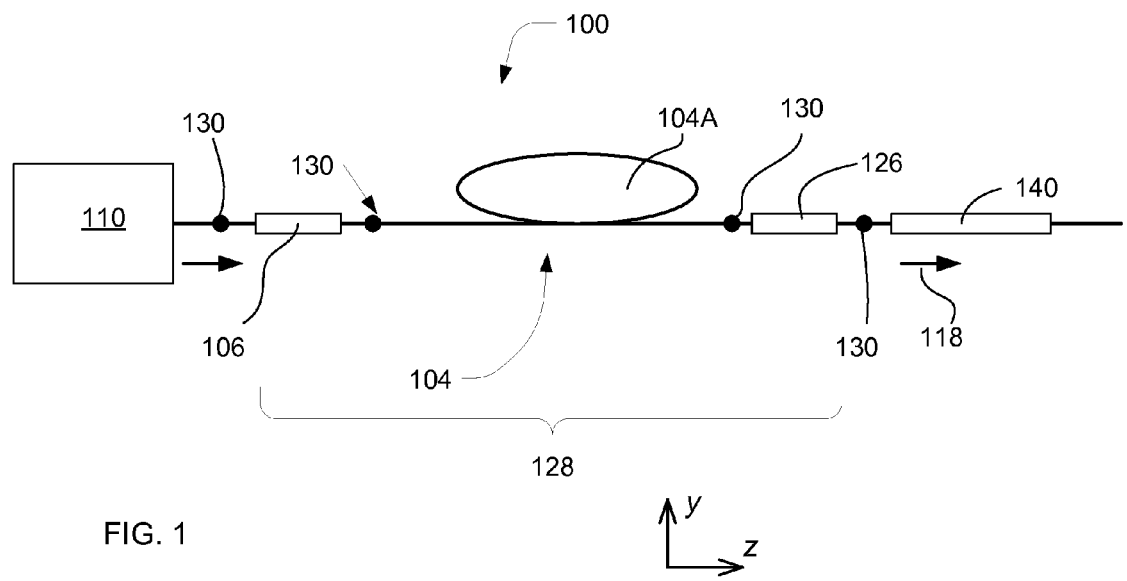
FIG. 1 is a schematic of an embodiment of the present invention.

Light can be directly generated in a fiber-laser cavity, and then be used directly or further amplified by at least one fiber amplifier. FIG. 1 illustrates schematically a typical fiber laser system 100 that includes a fiber element 104 providing optical gain (gain fiber, shown here forming a loop 104A) that is pumped, through the at least one fiber Bragg grating (FBG) 106, with a pump laser 110. Pump laser source 110 is used to excite the active ions in the medium of the gain fiber 104. The gain fiber 104 is further optically coupled with a second set of at least one FBG 126. Aggregately, the FBGs 106 and 126 form the fiber-laser cavity 128. Different fiber-optic components of the embodiment 100 are typically fusion-spliced (as indicated by joins 130). The FBG 106 that is close to the pump laser 110 acts as a high-reflectance reflector, while the FBG 126 is configured to operate as the fiber-laser output coupler. The pump laser 110 can be directly coupled into the fiber laser cavity 128, or, alternatively, it can be coupled into the fiber laser cavity through a pump combiner unit (not shown), the purpose of which is to enable simultaneous coupling of pump light into the fiber-laser cavity from more than one pump laser source. The light 136 from the fiber laser cavity 128, on its way towards the output, is typically is passed through a pigtailed optical fiber isolator 140. The isolator 140 is (optionally) used to block any optical feedback, generated due to spurious and/or parasitic reflections and returned to the fiber laser cavity 128, which may destabilize the operation of the fiber laser and, in some extreme cases, even damage the pump laser 110.

Figure 2:
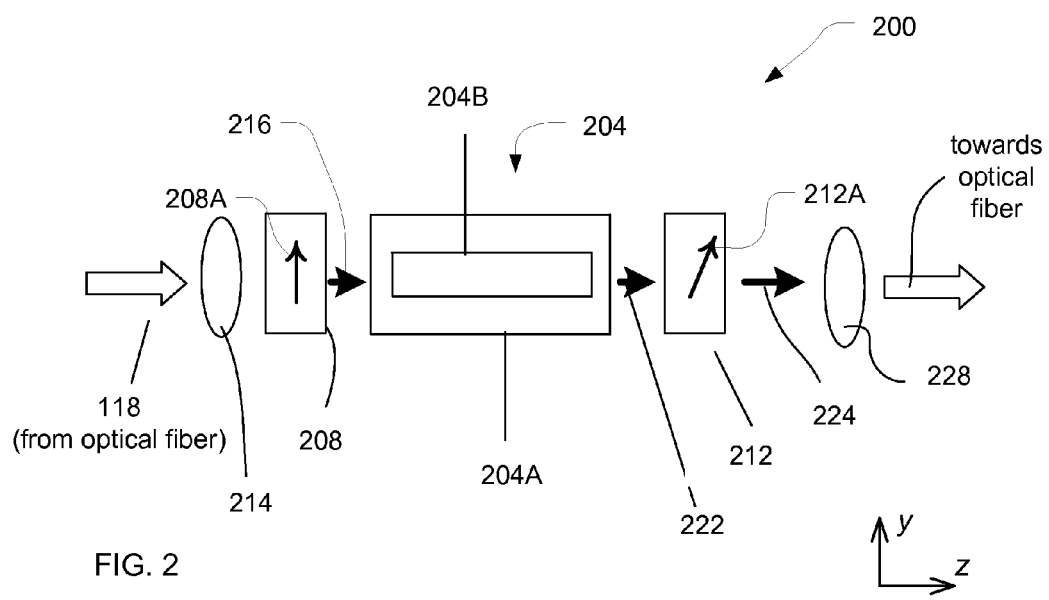
FIG. 2 is a diagram showing a free-space embodiment of a fiber-pigtailed Faraday isolator unit.

A free-space embodiment 200 of a fiber-pigtailed Faraday isolator unit 140 that is currently used in related art is shown in FIG. 2. The operation of the embodiment 200, which includes a Faraday rotator device sandwiched between two optical polarizes, is polarization dependent. The embodiment 200, as shown, employs a free-space bulk Faraday rotator device 204 (including a cell 204a creating a magnetic field throughout thereof, and a material 104b appropriately chosen to have a high Verdet constant) and input and output linear polarizers 208 and 212 (denoted so in reference to a direction of forward propagation of light, z-axis), having respective transmission axes shown with arrows 208a, 212a.

A portion 216 of input light 118, having a linear polarization parallel to the vector 208A, upon being collimated passing through the collimating lens 214 and the input polarizer 208 is coupled into the rotator device 204. The Faraday rotator 204 rotates the vector of polarization of light 216 by, typically, 45 degrees and passes the output light 222 towards the output polarizer (also referred to as analyzer) 212. A component, of light 222, having polarization collinear with the transmission axis 212A, emerges at an output of the polarizer 212 as light 224 that is further focused on a following fiber-optic element (not shown) with the lens 228. Any light beam propagating in the opposite direction (i.e., in the −z direction), for example, back-reflected light, is rotated additionally by forty-five (45) degrees when it passes through the Faraday rotator 204 the second time, thereby emerging from the rotator 204 with a polarization vector that is orthogonal to the transmission axis 208A of the polarizer 208. The polarizer 108, therefore, blocks the back-reflected light. When the polarization vector of the input light 220 is aligned to be parallel to the transmission axis 208A, and when the transmission axis 212A is aligned to be parallel to the rotated vector of polarization of light 222 (emerging from the Faraday rotator 204), the attenuation of light upon the propagation through the Faraday isolator 200 is minimized and the optical isolation of the feedback is optimized. Typically, a Faraday rotator such as the Faraday rotator device 204 includes a terbium gallium garnet (TGG) crystal or terbium-doped glass. Terbium gallium garnet (TGG), has one of the highest Verdet constants of −40 rad/T·m at 1064 nm.

When the laser beam 224 is focused at a fiber facet, the fiber could be damaged because of the misalignment or due to the change of alignment caused by operating temperature or vibration if the power of the laser beam is high. Accordingly, typically the throughput power of fiber pigtailed isolator is limited to about 20 W average power. Therefore, the output power of fiber lasers and fiber amplifies using the fiber pigtailed isolator is also limited to about 20 W average power. However, a much high output power is needed for a variety of applications including scientific research, medial applications, military and defense applications, and materials processing.

Embodiments of the present invention address fiber laser and fiber amplifier systems that employ an all-fiber isolator in order to enable the operation at output power levels exceeding 100 W average power levels or peak power larger than about 5 kW.

Figure 3:
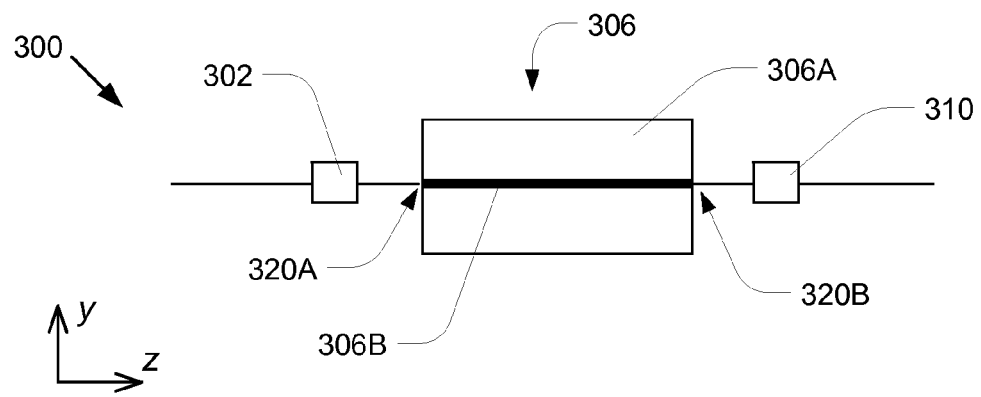
FIG. 3 illustrates an embodiment of an all-fiber-optic isolator device.

Turning now to FIG. 3, an embodiment 300 of an all-fiber-optic isolator device is illustrated. The embodiment 300 includes, in the order encountered by light propagating through the device 300 along the z-axis, a first fiber-optic based polarizer 302, a fiber-optic based Faraday rotator 306 containing a fiber optic component 306B disposed within a magnetic cell 306A (shaped, for example, as a tube), and a second fiber-optic based polarizer 310. The ends of the fiber-optic component 306B are fusion-spliced with corresponding ends of the polarizers 302 and 310 (as shown schematically by fiber-fusion splicing joints 320A and 320B), thereby creating an all-fiber-optic based device, with no free-space light propagation regions of elements involved from the input end to the output end of the embodiment 300. Because the device is devoid of a free-space element, there is no free-space coupling of light into the optical fiber involved between the input and output of the device. Therefore, such device has a much higher laser induced damage threshold as compared with that employing a fiber pigtailed isolator. The throughput power can be at a level of kilowatts of average power for each fiber. When all fiber elements are fusion-spliced together, the laser-light-induced damage will mainly include break-down of fibers and heat-induced effect in a given fiber. The fiber break-down for a fiber of about 20 micron core diameter occurs at about 5 kW or higher average power levels. The propagation loss of Faraday rotating optical fiber elements used in the present invention is higher than that of a typical commercially-available silica optical fiber. Based upon the absorption of the laser power in the Faraday rotating fiber element, a damage threshold is estimated to be greater than 1 kW. This is an unexpected contradistinction with some devices of the related art that employ the combination of several fibers or channels of fiber laser (amplifier) to achieve such high levels of output power.

Figure 4:
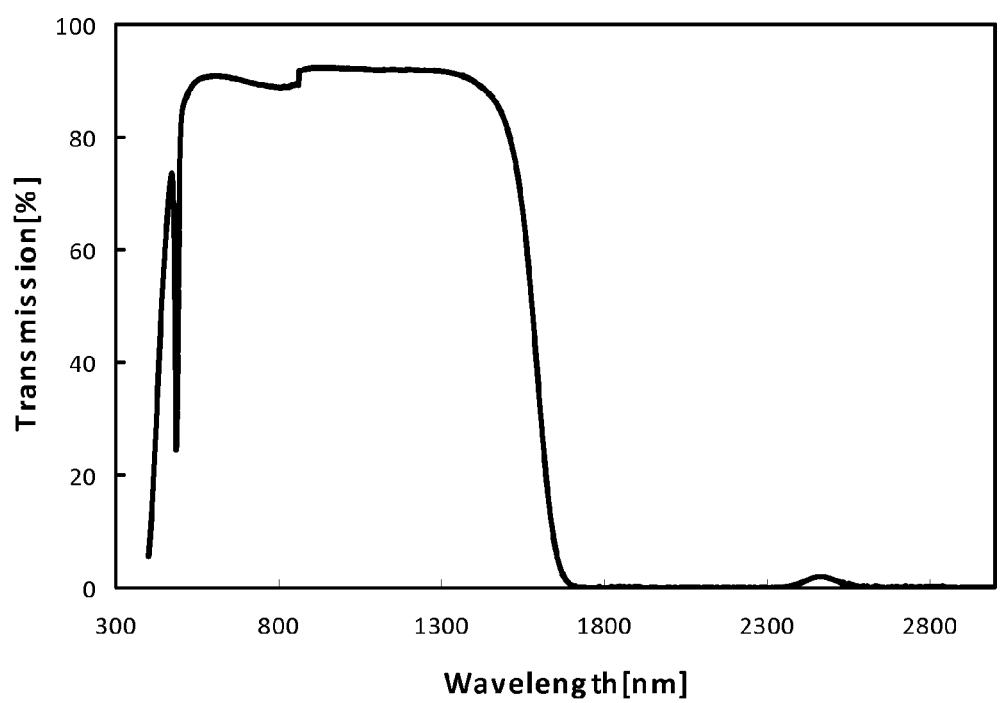
FIG. 4 is a graph of transmission spectrum of terbium-doped glass.

The fiber optic component 306B, used in a Faraday rotator 306, is doped with a rare-earth oxide such as at least one of $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $La_2O_3$, $Ga_2O_3$, $Ce_2O_3$, and $Lu_2O_3$. In a specific embodiment, the component 306B may include terbium-doped glass. FIG. 4, showing a transmission spectrum of glass doped with 55 weight-percent of $Tb_2O_3$, illustrates that, while $Tb_2O_3$ exhibits a Verdet constant that is the highest among those corresponding to the rare-earth oxides, this material also absorbs light in spectral regions near 1.5 microns and 2 microns.

In further reference to FIG. 3, the material of the fiber-optic component 306B used in a Faraday rotator 306 is doped, in one embodiment, with at least one of $La_2O_3$, $Ga_2O_3$, $Yb_2O_3$, and $Ce_2O_3$. It is preferred that fiber lasers operating at high power levels used with such an embodiment of the Faraday rotator operate at wavelengths near 1.5 micron or near 2 microns.

In further reference to FIG. 3, in another related embodiment the fiber-optic component 306B includes a multicomponent glass. Specifically, the core and/or cladding of such multicomponent-glass fiber optic 306B may contain, for example, silicate glass, germanate glass, phosphate glass, borate glass, tellurite glass, bismuth glass, and/or aluminate glass. In addition or alternatively, the multicomponent glass of the fiber-optic component 306 may include glass network formers, intermediates, and modifiers. In certain embodiments, the network structure of glass includes certain types of atoms that can significantly change the properties of the glass. Cations can act as network modifiers, disrupting the continuity of the network, or as formers, which contribute to the formation of the network. Network formers have a valence greater than or equal to three and a coordination number not larger than four. Network intermediates have a lower valence and higher coordination number than network formers. In a specific embodiment one or more glass network formers of the multicomponent glass of the fiber-optic component 306B of FIG. 3 include at least one of $SiO_2$, $GeO_2$, $P_2O_5$, $B_2O_3$, $TeO_2$, $Bi_2O_3$, and $Al_2O_3$.

The related art does not disclose a fiber-laser or fiber-amplifier system employing such an all-fiber-optic optical isolator and generating kilowatt-level power outputs. This may be due to the fact that fiber-optic elements doped with rare-earth materials conventionally have a doping concentration on the order of a few weight percent or even lower, which corresponds to a low Verdet constant. For example, a 2% (wt.) doped silica glass has a Verdet constant of approximately 1 rad/T·m. A Faraday rotator device employing such a fiber-optic component would require the fiber-optic component to be extremely long, on the order of one meter, before a rotation of a linear polarization vector of light guided by such a fiber-optic component reaches 45 degrees. Accordingly, the dimensions and weight of a magnet cell required to effectuate a performance of such a rotator become cost and operationally prohibitive. In contradistinction with the related art, the present invention employs fiber-optic components doped with rare-earth materials at significantly increased levels of greater than 55% (wt.). In certain embodiments, the doping concentration is greater than 65% (wt.). In other embodiments, the doping concentration is greater than 70% (wt.). In a specific embodiment, the doping concentration is between 55%-85% (wt.). These high levels of doping assure that resulting Verdet constants, of or about 30 rad/T·m facilitate the fabrication of a fiber-optic based Faraday rotator unit on the order of 5 cm.

Embodiments of the present invention employ either a single-mode or a multi-mode fiber that is doped with rare-earth material(s), employed in construction of a fiber-optic Faraday rotator element. In one embodiment, the fiber-optic based Faraday rotator is fusion-spliced with a fiber-based polarizing element (referred to hereinafter as fiber-optic polarizer) to form an all-fiber-optic isolator system. Fusion splicing, as known in the art, facilitates the collinear integration of two optical fiber component end-to-end using heat treatment in such a manner that light passing through a first fiber-optic component enters the second component without passing through free space and with minimized optical losses (i.e., scattering and reflection at a location of the splice is optimized). In a specific embodiment the power input of the Faraday rotator element is greater than 100 watts. Moreover, embodiments of the present invention implement all-fiber-optic polarizing elements which, when used in conjunction with the all-fiber-optic Faraday rotator embodiment, provide a novel all-fiber-optic laser or amplifier system structured to operate at kilowatt power levels and higher.

Figure 5:
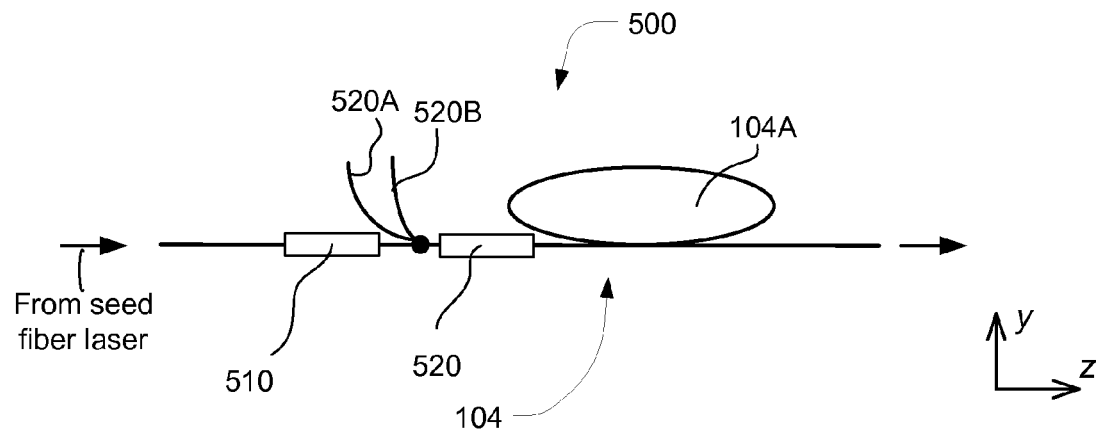
FIG. 5 shows schematically an alternative embodiment of the present invention.
Figure 6:
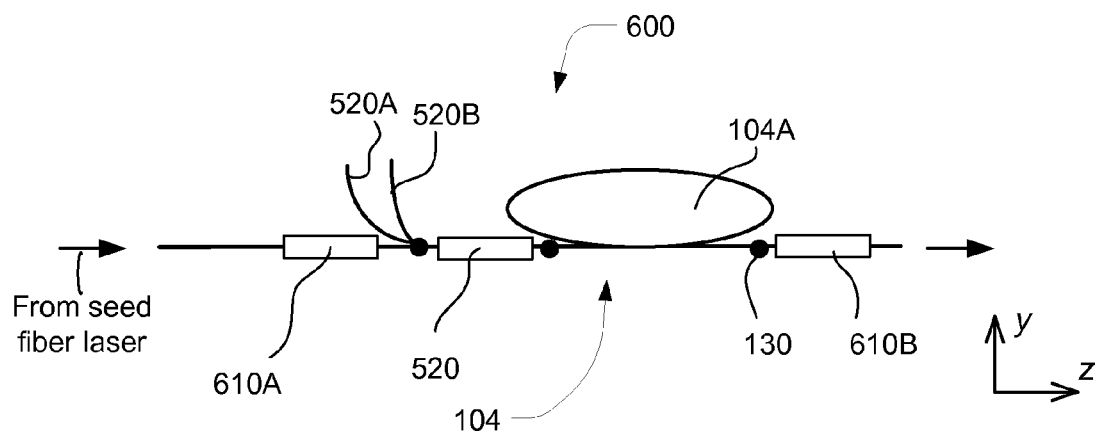
FIG. 6 shows schematically another alternative embodiment of the present invention.

The light output of a fiber laser can be boosted by a fiber amplifier. FIG. 5 illustrates schematically a typical fiber amplifier 500 juxtaposed to the output of the all-fiber isolator 510 (such as the isolator 300 of FIG. 3, for example) and a pump combiner 520 (allowing the combination of light outputs from more than one pump laser source, for example, as schematically illustrated by fiber-optic tails 520A, 520B). FIG. 6 is a diagram showing a related embodiment of a fiber amplifier 600 conjugated with two all-fiber isolators 610A, 610B.

The pump laser can be a single mode laser and/or a multi-mode laser. Pump can be forward pumping, backward pumping, and forward and backward simultaneously pumping. In many situations, residual pump power has to be removed with the use of a high index adhesive material. (As will be understood by a skilled artisan, in the case of a multi-mode fiber and a multi-mode pumped laser, while light of the fiber laser propagates in the core of the gain fiber, light of the pump laser propagates in its cladding. The low index polymer material or air acts as the external cladding material to guide the light of the pump laser in the cladding. When a higher index material is applied to the gain fiber, the cladding can not act as a waveguide anymore for the light of the pump laser which, accordingly, leaks from the fiber.) The optical isolator at the input end of the gain fiber 104 (such as the isolator 510, 610A) is typically required for a fiber amplifier to ensure good optical separation between the fiber amplifier and the seed laser (unless the seed laser incorporates its own output optical isolator unit). As a result of using the all-fiber isolator, the input (seed) laser could have a high average power or high peak power. In many cases both input and output isolators (see FIG. 6) are used in order to ensure there is no back reflection feed back to the amplifier.

In order to achieve higher output power, multi-stage fiber amplifiers can be used.

TABLE 1

| Composition | $SiO_2$ | $Al_2O_3$ | $B_2O_3$ | $CeO_2$ | $Tb_2O_3$ |
|---|---|---|---|---|---|
| wt % | 9.9 | 0.9 | 7.4 | 0.1 | 72.7 |
| wt % | 13.3 | 13.9 | 10.7 | 0 | 62.2 |

TABLE 1-continued

| Composition | SiO$_2$ | Al$_2$O$_3$ | B$_2$O$_3$ | CeO$_2$ | |
|---|---|---|---|---|---|
| wt % | 12.2 | 13.3 | 10 | 0 | 64.5 Yb$_2$O$_3$ |
| wt % | 14.8 | 16.5 | 10.3 | 0.1 | 58.3 Er$_2$O$_3$ |
| wt % | 15.1 | 16.8 | 10.5 | 0.1 | 57.6 Yb$_2$O$_3$ |
| wt % | 16 | 17.8 | 11.1 | 0.1 | 55 |

Table 1 presents non-limiting examples of terbium-doped silicate glasses, erbium doped glasses, and ytterbium-doped silicate glasses that can be used with embodiments of the present invention.

Figure 7:
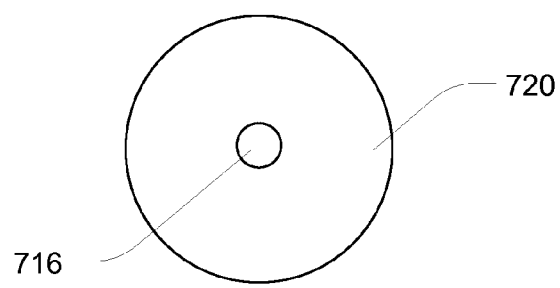
FIG. 7 is a cross-sectional view of an exemplary highly rare-earth doped fiber for use with an embodiment of the present invention.

Turning now to FIG. 7, a cross-sectional view of an exemplary highly rare-earth doped fiber-optic pre-form for fabrication of a fiber-optic component (such as the component 306b of FIG. 3) of a Faraday rotator of the present invention shows a glass core rod 716 is surrounded by a glass cladding tube 720. The outer diameter of the core 716 is the same as the inside diameter of the cladding 720 such that there is no void or gap between the core and the cladding. A fiber-optic component for a fiber-optic based Faraday rotator embodiment of the invention is manufactured using a rod-in-tube fiber drawing technique. The core glass rod 716 is drilled from a bulk highly rare-earth doped glass and the outer surface of the core glass rod 716 is polished to a high surface quality. The cladding glass tube 720 is fabricated from another piece of rare-earth doped glass with a refractive index that is slightly lower than that of the rod 716. The inner and outer surfaces of cladding glass tube 720 are polished to a high surface quality. After, the rod 716 is placed in the glass tube 720 and then the combination of the two is heated until the tube shrinks around the rod, followed by a well-known fiber-drawing procedure.

Figure 8:
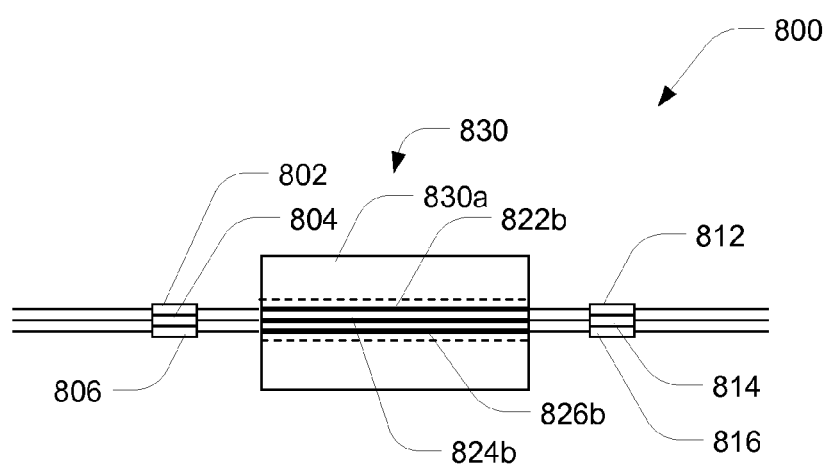

FIG. 8 illustrates an embodiment 800 employing an array of isolators each of which is structured according to an embodiment of the present invention. As shown, the array 800 includes fiber-optic based polarizers 802, 804, 806, 812, and 814, and 816 linearly integrated (for example, with the use of fusion splicing) with fiber-optic elements 822b, 824b, and 826b positioned inside the magnetic tube 830a of the Faraday rotator device 830. In one embodiment, the inner diameter of the magnetic tube 830a is about 1 mm to about 10 mm. In a specific embodiment, the outer diameter of each of the fiber optic components 822b, 824b, and 826b is about 0.125 mm.

In one embodiment, the fiber-optic components 822b, 824b, and 826b may all be made of the same type of glass doped with the same rare-earth oxides. Alternatively, however, in a different embodiment, these components are made of different types of glass and are doped with different rare-earth oxides. Due to different type of doping, in such an alternative embodiment, these components 822b, 824b, and 826b may be used at different wavelengths. For example, a first fiber-optic component will absorb light in a specific spectral bandwidth while a second component will absorb light in a different spectral bandwidth. In yet another embodiment the fiber-optic components 822b, 824b, and 826b represent fiber optic elements made of the same type of glass but doped with different concentrations of a given rare-earth oxide. In one embodiment fiber-based polarizers 802, 804, 806, 812, 814, and 816 are all the same type of fiber-based polarizers. Generally, however, optical properties of fiber-based polarizers 802, 804, 806, 812, 814, and 816 may differ.

FIG. 9 presents a schematic of an exemplary system comprising the Faraday isolator array 800 of FIG. 8 in conjunction with an array of corresponding fiber lasers. A fiber laser is a laser in which the active gain medium is an optical fiber doped with rare-earth elements. As shown in FIG. 9, each of the optical channels of the Faraday isolator array 800 is arranged in a respective optical communication with a corresponding fiber laser of fiber lasers 940, 942, and 944. While fiber lasers 940, 942, and 944 may be the same, generally they differ in terms of at least one of power output, wavelength of operation, and/or regime of operation (such as, for example, pulse duration).

FIG. 10 presents a schematic of an exemplary system comprising the Faraday isolator array 800 of FIG. 8 in optical cooperation with a series of cascade fiber lasers and amplifiers. The embodiment 1060 includes the isolator array 800, cascade fiber laser 1070, and amplifiers 1072 and 1074. The polarization-rotating fiber-optic component 822b of the Faraday rotator device of the isolator array 800 is shown to be sandwiched between and linearly integrated to the laser 1070 and the amplifier 1072. The amplifier 1072, in turn, is optically cooperated with the polarization-rotating fiber-optic component 824b. The component 824b is further sequentially coupled to and linearly integrated with the amplifier 1074 and, through the amplifier 1074, with the polarization-rotating fiber-optic component 826b. In a particular embodiment, fiber-optic portions 1082, 1084, and 1086 and fiber-optic portions 1088, 1090, and 1092 interconnecting various active elements of the embodiment of FIG. 10 have the same optical and material properties as fiber-optic components 822b, 824b, and 826b, respectively. Alternatively, however, these interconnecting portions differ from the polarization-rotating fiber-optic components of the Faraday rotator device in at least one of glass type, doping material, and doping concentration. Generally, Verdet constants of materials from which the interconnecting fiber-optic portions 1082, 1084, 1086, 1088, 1090, and 1092 are made differ from those of the polarization-rotating fiber-optic components 822b, 824b, and 826b of the Faraday rotator device of the embodiment. In addition, the signs of Verdet constants of the interconnecting fiber-optic portions may differ from those of the polarization-rotating fiber-optic components of the Faraday rotator device.

Figure 11:
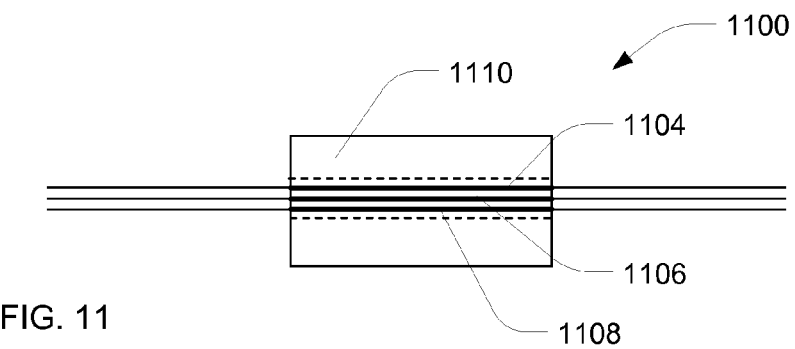

An alternative schematic of an all-fiber-optic Faraday rotator array 1100 is depicted in FIG. 11 to include fiber-optic components 1104, 1106, and 1108 disposed inside a magnetic cell 1110. Each of the polarization-rotating components of the embodiment is further linearly integrated with corresponding fiber-optic elements outside of the magnetic cell 1110 by, for example, fusion splicing, and, in conjunction with the magnetic cell 1110, is adapted to operate as a fiber-optic element rotating the polarization vector of light guided therein via the Faraday effect.

Figure 12:
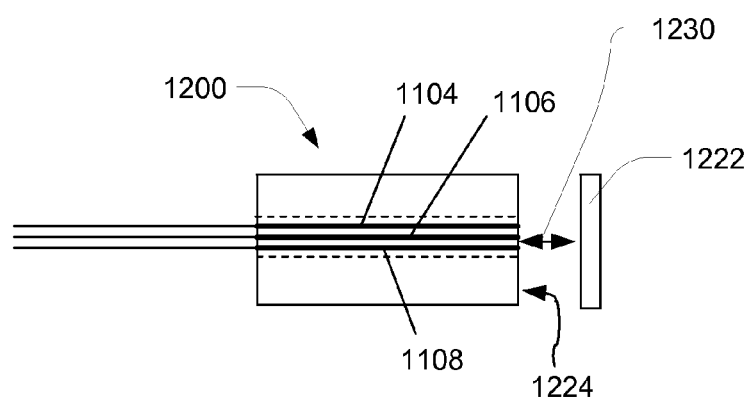

FIG. 12 depicts an exemplary schematic of a Faraday rotator array 1200 optically cooperated at one end with a reflector shown as a general reflective element 1222. The reflective element is adapted to reflect light, propagating in the z-direction along the polarization-rotating fiber-optic components 1104, 1106, and 1108 and to return a portion the same back into the Faraday rotator 1200, as shown by an arrow 1230. In different embodiments, the general reflective element 1222 may include a fiber Bragg grating linearly integrated with the fiber-optic components of the Faraday rotator, a metallic and/or dielectric coatings, disposed on the output facets of the fiber-optic components of the Faraday rotator coating, a stand-alone reflector optionally physically separated from the output 1224, or even a combination thereof. It is appreciated, therefore, that, while the details of optical coupling between the output 1224 and the reflective element 1222 are not shown, such optical coupling may be arranged using any of means known in the art such as, for example, coupling using optical elements such as lenses or butt-coupling, thin-film deposition, or fusion splicing of otherwise independent fiber-optic elements. It is also appreciated, therefore, that a gap between the output 1224 of the Faraday rotator 1200 and the general reflective element 1222 is not intended to represent necessarily free space.

In one embodiment, polarization-rotating fiber-optic components of the Faraday rotator 1200 are made of the same glass material doped with the same rare-earth oxide(s). Generally, however, these fiber-optic components are made of different type(s) of glass doped with different rare-earth oxide(s), in which case they may be used for operating at different wavelengths chosen according to optical properties defined in these components by particular types of dopant(s). Generally, therefore, different fiber-optic components of the Faraday rotator 1200 may function differently, for example, one polarization-rotating fiber-optic component may absorb light in a specific spectral band, while another component may absorb light at different wavelengths. In yet another embodiment, the components 1104, 1106, and 1108 utilize the same type of glass material but are doped with a rare-earth oxide(s) of different types and/or concentrations.

Figure 13:
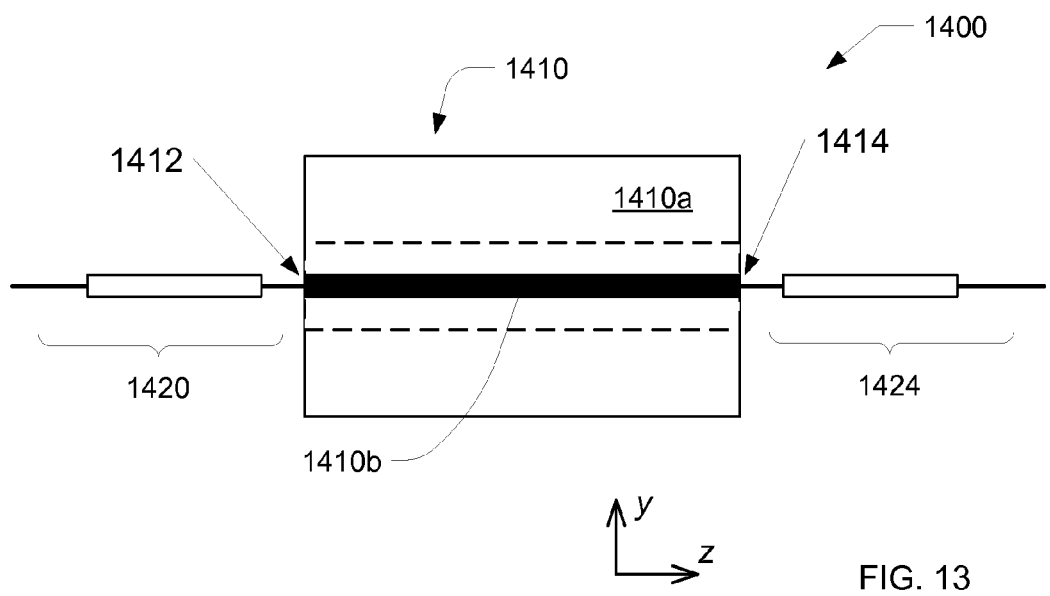
FIG. 13 demonstrates schematically another sub-system of an embodiment of the invention.

An alternative embodiment 1400 of an all-fiber-optic isolator system is shown in FIG. 13 to include an embodiment 1410 of a Faraday rotator that contains, as discussed above, a magnetic cell 1410a such as a tube made of magnetic material and a fiber-optic component 1410b disposed inside and along the cell 1410a. The fiber-optic component is made of glass doped with a rare-earth based material at doping levels of at least 55 wt % to 85 wt % in accordance with an embodiment of the invention. The component 1410b is linearly integrated at each of its ends, respectively corresponding to an input 1412 and an output 1414 of the Faraday rotator 1410, with outside polarizing components 1420 and 1424 at least one of which configured to include beam splitters/combiners utilizing polarization-maintaining (PM) fiber optic elements. The idea of a non-polarizing fiber-optic beam splitter is readily understood in the art and is not discussed in detail herein. Depending on the configuration, a non-polarizing fiber-optic splitter may split the light wave guided by M optical fibers into N>M independent channels, in a multipoint-to-multipoint link arrangement. (The simplest form of non-polarizing fiber-optic splitter is known as a Y-splitter, where M=1, N=2). A non-polarizing fiber-optic combiner is, in the simplest case, a fiber-optic splitter operating in reverse, and multiplexing light waves guided in N independent channels into M<N channels. In contradistinction, embodiments of the present invention take advantage of a fiber-optic beam splitter/combiner the operation of which depends on the state of polarization of light guided within the fiber-optic component.

Figure 14:
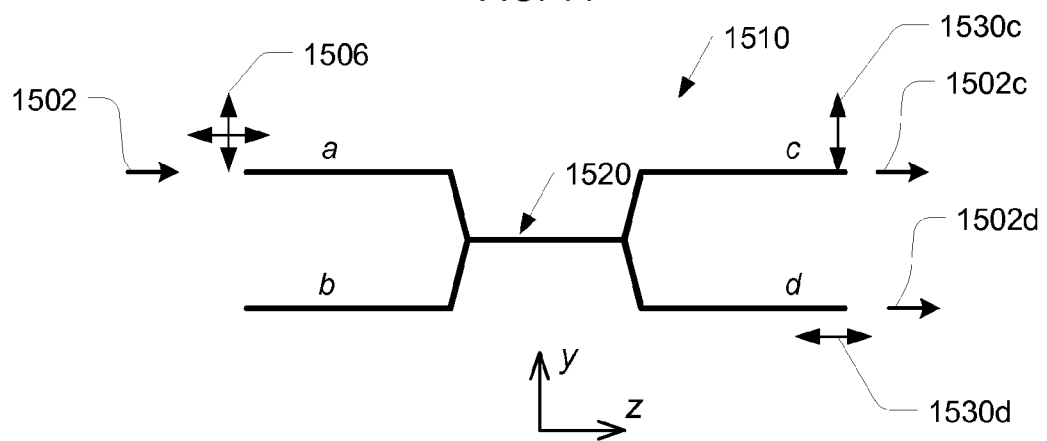
FIGS. 14 and 15 illustrate performance of a polarization-maintaining fiber-optic splitter/combiner.
Figure 15:
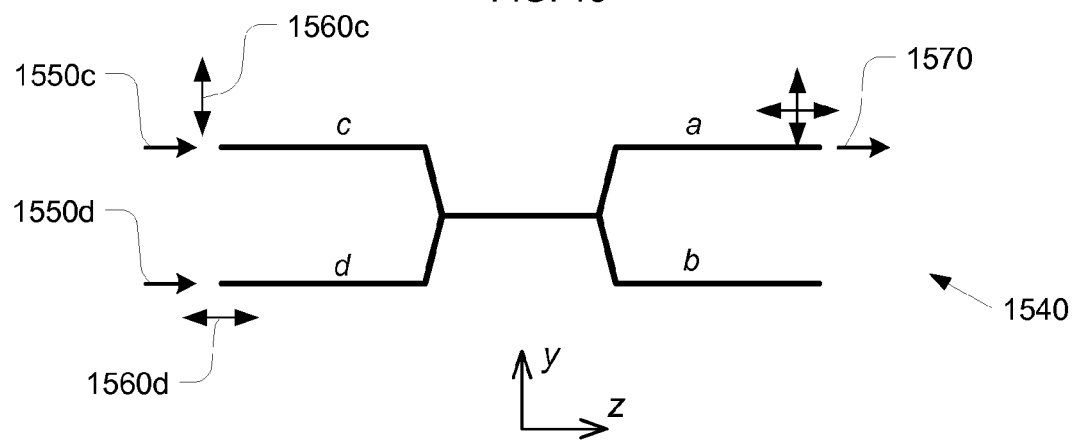

FIGS. 14 and 15 illustrate a simple X-type fiber-optic splitter that employs PM optical fibers. In general, an embodiment of polarizing fiber-optic splitter is configured to spatially separate components of a guided, inside the fiber optic, light wave according to the polarization content of the guided wave, and to couple the guided wave components having orthogonal states of polarization into different branches of the splitter. For example, a light wave 1502 of a given type of polarization (schematically denoted with arrows 1506) that is coupled into an input branch of the polarizing fiber-optic beam-splitter 1510 to propagate, along the z-direction, towards a junction 1520 of the splitter 1510, is divided, in the junction 1520, such as to appropriately separate components 1502c and 1502d of the wave 1502 having orthogonal states 1530c and 1530d of polarization into different output branches c and d of the splitter. Operation of a fiber-optic beam combiner 1540 that utilizes polarization-maintaining optical fibers is similar. As shown in FIG. 15, such a combiner is configured to bring together (or combine) two guided waves 1550c and 1550d with corresponding orthogonal polarizations 1560c and 1560d coupled, respectively, into the branches c and d of the combiner 1540, and to outcouple the (combined) light wave, having a state 1570 of polarization, into a chosen output branch of the combiner (as shown, branch a).

Figure 16:
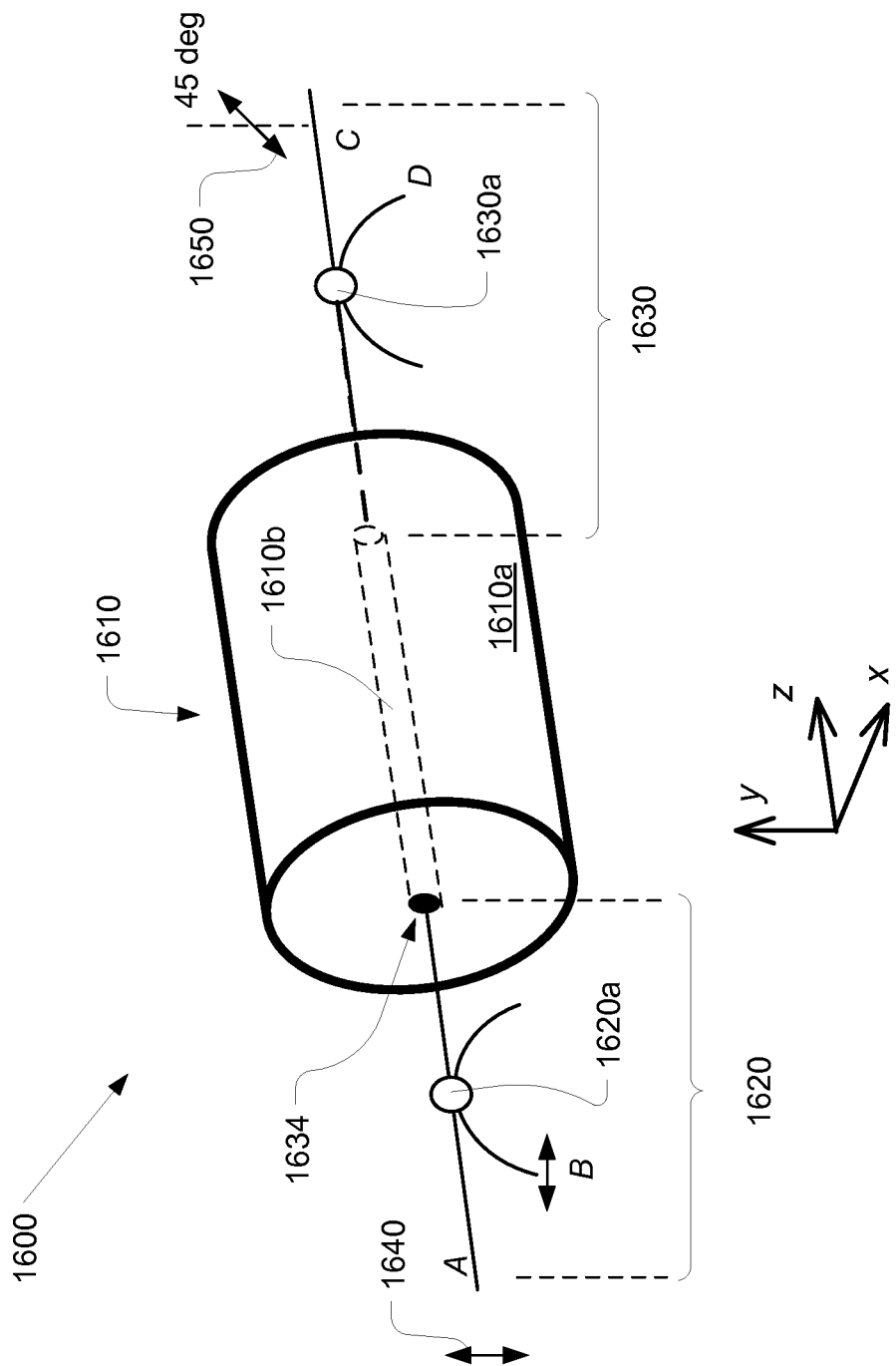
FIG. 16 depicts, in perspective view, another embodiment of the present invention utilizing a splitter/combiner of FIGS. 14 and 15.

As illustrated schematically in FIG. 16, an embodiment 1600 of an all-fiber-optic isolator of the present invention includes a polarization-rotating fiber-optic based Faraday cell 1610 that contains a rare-earth-doped fiber-optic component 1610b disposed along the length of an inside tubular magnetic cell 1610a. The embodiment 1600 further contains input and output polarization-maintaining-fiber based beam splitter/combiner components 1620 and 1630 that are linearly integrated with respectively corresponding input or output of the fiber-optic component 1610b such as to form an uninterrupted fiber-optic link, optically connecting input fiber-optic branches A and B and output fiber-optic branches C and D through a rare-earth doped component 1610b. Different branches of the splitters/combiners 1620 and 1630 are adapted to guide light waves having orthogonal states of polarization.

By way of non-limiting example of operation, and upon forward propagation of light the embodiment 1600 operates as follows. When an input light wave that is linearly polarized, 1640, along a predetermined axis (y-axis as shown) is coupled into the input branch A of the PM fiber-optic based splitter/combiner 1620, the splitter/combiner 1620 transmits this wave, generally in a z-direction, through the junction 1620a towards the Faraday rotator 1610. Upon traversing the Faraday rotator 1610, the polarization vector 1650 of the guided light wave is rotated by 45 degrees. The guided light wave is further coupled into the splitter/combiner 1630 configured to transmit light polarized at k degrees with respect to the predetermined axis into the output branch C and further, towards an optical component or system to which the branch C is coupled. Any portion of the light wave back-reflected into the branch C (m, generally, −z direction as shown) will enter a polarization-rotating component 1610b of the all-fiber-optic link of the embodiment 1600 upon traversing the junction 1630a of the splitter/combiner 1630 and emerge at the end 1634, of the component 1610b of the Faraday cell 1610, will have its polarization vector additionally rotated by 45 degrees. The resulting state of the back-reflected light wave at a splice 1634 between the component 1610b and the splitter/combiner 1620 is orthogonal to the state of polarization supported by the A branch of the splitter/combiner 1620. Since the branch B of the splitter/combiner 1620 is configured to guide light having polarization orthogonal to that supported by the branch A, the back-reflected light wave is outcoupled through the branch B. A skilled artisan will appreciate the fact that an embodiment 1600 of the invention isolates a laser source coupled into the branch A of the embodiment from the unwanted optical feedback formed in reflection downstream of the optical path.

It should be noted that unconventionally high levels of doping, with rare-earth materials, of glass matrix of the fiber-optic components of the Faraday cell of the invention assure that rotation by 45 degrees or so of the vector of linear polarization of light guided by the fiber-optic components of the Faraday cell is accomplished at propagation lengths of or about several centimeters (for example, about 5 to 10 cm).

Further aspects of the present invention employ the use of multiple magnets with any of the foregoing disclosed Faraday rotators and isolators. The use of multiple magnets (as compared with the use of a single magnet or magnetic tube) allows for the use of separate magnetic segments that have smaller diameters than that required in a single-magnet embodiment, thereby reducing the total volume and total weight of the magnetic portion of the Faraday rotator or isolator. Thus, the overall magnetic field intensity per volume is increased, resulting in the need for less magnetic material than in single magnet embodiments to achieve the same degree of rotation and a lower manufacturing cost (because of the reduction in the volume of magnetic material). A further advantage is that smaller diameter magnets are easier to magnetize than the larger magnets required in single magnet embodiments.

Figure 18A:
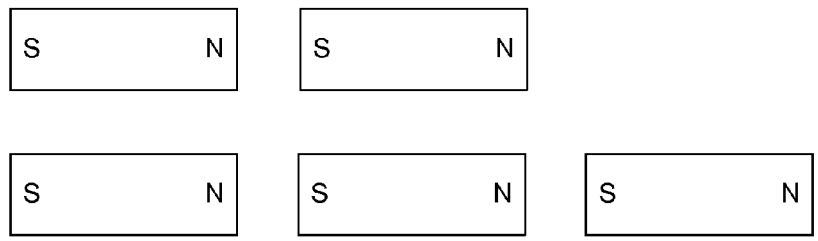
FIGS. 18A, 18B, and 18C schematically illustrate possible magnetic orientations for the magnetic cells of the invention.
Figure 18B:
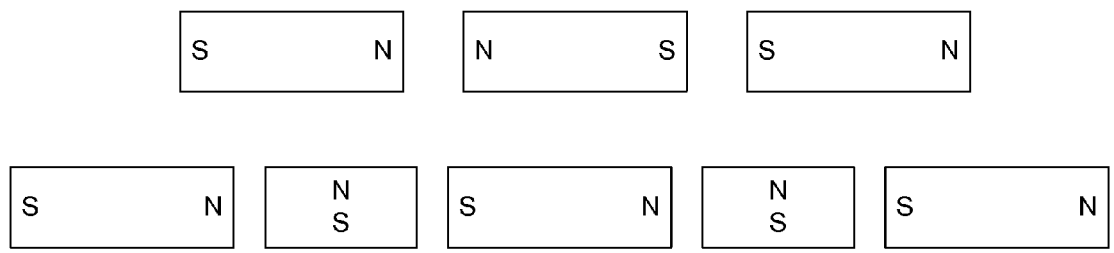

As will be appreciated, when multiple magnets are used, the segments can be arranged in two basic orientations. As shown in FIG. 18A, the magnets can be arranged such that the opposite magnetic poles are facing each other. In this arrangement each magnet has the same magnetic orientation. Conversely, as show in FIG. 18B, the magnets can be arranged such that the same magnetic poles are facing each other. (In other words, in this orientation each magnet has a magnetic orientation that is opposite to that of an immediately neighboring magnet). Other possible orientations are permutations of what is shown in FIGS. 18A and 18B. Specifically, some of the magnets could be arranged such that the magnetic poles are facing each other while others are arranged such that the opposite poles are facing each other. A schematic of such an arrangement is shown in FIG. 18C.

Figure 18C:
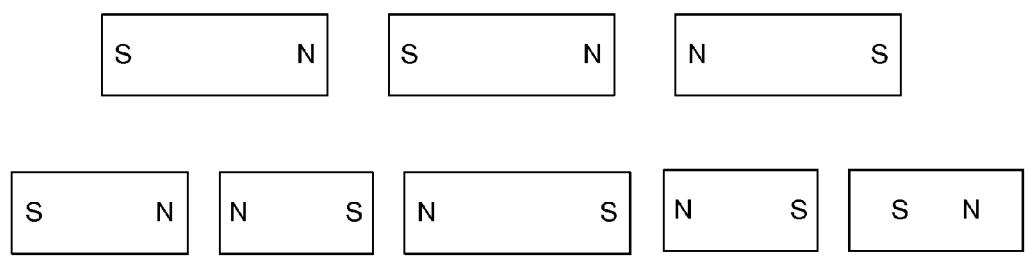

As is shown in FIGS. 18A, 18B, and 18C, the use of two, three, four, or even bigger number of magnets is within the scope of the present invention. In one specific embodiment, however, three magnets are used. Further, it is appreciated that the magnets themselves may be of the same or differing sizes (as shown in FIG. 18B, for example).

Figure 18D:
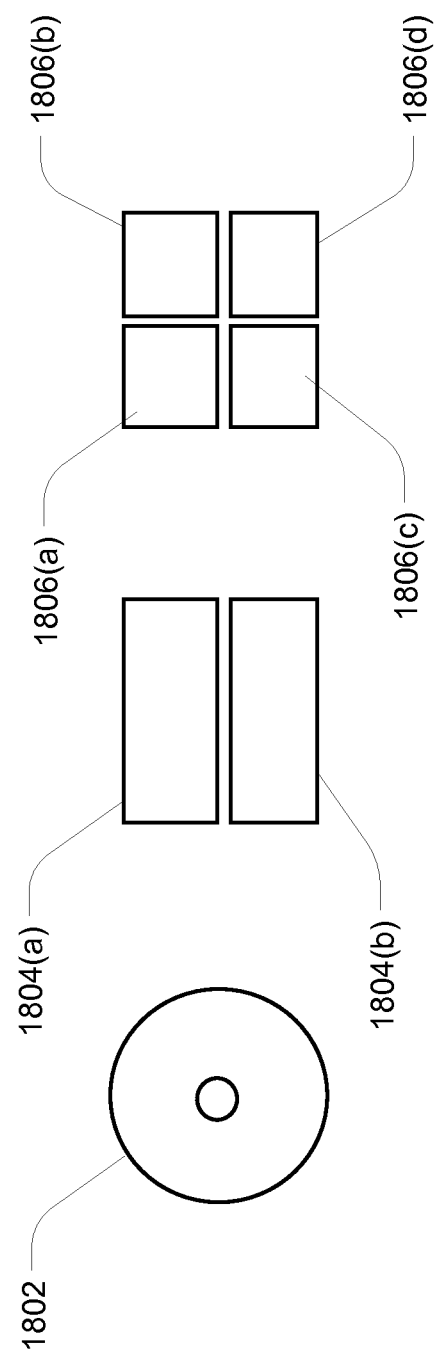
FIG. 18D schematically illustrates the cross section of the magnetic cells used in the invention.

Referring now to FIG. 18D, in certain embodiments the magnetic segments used are separate sections of a magnetic tube, each having cross-section 1802. In other embodiments, the magnetic segments used are not separate sections of a magnetic tube and instead have rectangular cross-sections, such as cross-sections 1804(a) and 1804(b), or square cross-sections, such as cross-sections 1806(a)-(d). In still other embodiments, separate magnetic segments having other cross-sections are used. Further, in certain embodiments a mixture of magnets having various cross-sections are used. Thus, by way of a non-limiting example, one portion of the fiber can be surrounded by a segment of a magnetic tube while another portion is surrounded by magnetic segments having a square cross-section.

In further reference to FIG. 18A, where the separate magnetic segments are aligned such that the opposite poles of the magnets face one another, optical fibers associated with the same direction of Faraday rotation are placed inside the magnets, while optical fibers associated with the opposite direction of the Faraday rotation or fibers with materials having very small Verdet constants (i.e., fibers having a small rotation angle under the same magnetic field flux density) are placed in-between the magnets.

Figure 19A:
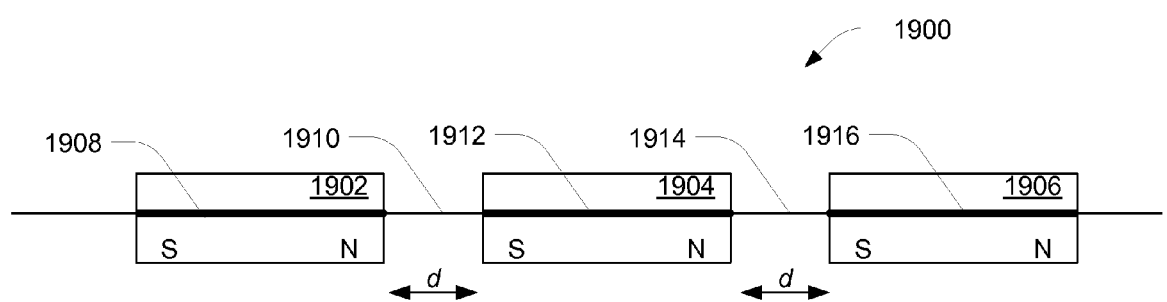
FIGS. 19A and 19B are schematic illustrations of Faraday rotators according to the present invention.

An example of the schematic of such embodiment including a Faraday rotator of an all-fiber-optic isolator is illustrated in FIG. 19A. As can be seen, the Faraday rotator 1900 includes fiber optic components 1908, 1912, and 1916 within respectively corresponding magnetic cells 1902, 1904, and 1906, where these magnetic cells are oriented such that opposite magnetic poles of the cells are facing one another. Fiber optic components 1908, 1912, and 1916 are associated with the same direction of the Faraday rotation. (In one embodiment, components 1908, 1912, and 1916 are made of the same glass materials. In another embodiment, fiber optic components 1908, 1912, and 1906 are made of different glass materials. In yet another embodiment, each of the fiber optic components 1908, 1912, and 1906 has a different doping concentration.)

Referring again to FIG. 19A, each of the fiber optic components 1910 and 1914, respectively located between the magnetic segments (1902, 1904) and (1904, 1906), is associated with the direction of the Faraday rotation that is opposite to that of the fiber optic components 1908, 1912, and 1906. Alternatively or in addition, the components 1910, 1914 have very small Verdet constants. By way of example and not limitation, in certain embodiments, fiber optic components 1908, 1912, and 1906 include a Tb-doped optical fiber, while fiber optic components 1910 and 1914 include undoped fibers (and thus have very small Verdet constants). Alternatively, by way of example and not limitation, fiber optic components 1910 and 1914 include La-doped fibers, which enable the Faraday rotation in the direction opposite to that associated with the Tb-doped fiber optic components 1908, 1912, and 1906.

For the embodiment depicted in FIG. 19A, magnetic cells 1902, 1904, and 1906 must be separated by a certain distance d from one another, otherwise the magnetic field intensity around fiber optic components 1908, 1912, and 1916 will be reduced. In certain embodiments this distance d is about a half of the length of the magnetic cell. In other embodiments distance d is larger or smaller than a half of the length of the magnetic cell. In yet another embodiment (where still other embodiments more than two magnetic cells are used, for example) the distances between the pairs of the two immediately neighboring cells may differ from one another.

Figure 19B:
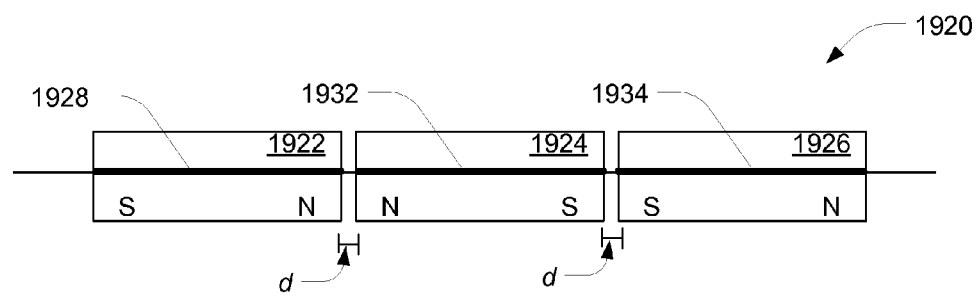

In embodiments where the separate magnetic segments are aligned such that the same poles of the magnets face one another (as depicted in FIG. 18B) Faraday rotating fibers having a high Verdet constant are placed in every other magnetic segment while the intervening segments of the fiber-optic have fibers having the opposite Faraday rotating direction or a very small Verdet constant. An embodiment of such a Faraday rotator of an all-fiber-optic isolator is illustrated in FIG. 19B. As can be seen in FIG. 19B, the Faraday rotator 1920 includes fiber optic components 1928, 1932, and 1934 within respectively-corresponding magnetic cells 1922, 1924, and 1926, where these magnetic cells are oriented such that the same magnetic poles of the immediately neighboring cells are facing one another. In the illustrated embodiments, fiber optic components 1928 and 1934 have a high Verdet constant and the same Faraday rotational direction. In certain embodiments, fiber optic components 1928 and 1934 comprise the same glass materials. In other embodiments, fiber optic components 1928 and 1934 comprise different glass materials. In still other embodiments, fiber optic components, 1928 and 1934 have different doping concentrations.

In contrast to the embodiment shown in FIG. 19A, in certain embodiments fiber optical component 1932 of Faraday rotator 1920 will have the opposite Faraday rotating direction from fiber optic components 1928 and 1934. In other embodiments, fiber optical component 1932 has a very small Verdet constant.

While the embodiment illustrated in FIG. 19B has been described such that the fibers having a high Verdet constant are in the first and third magnetic cells (as shown, the cells 1922 and 1926), while the fiber in the intermediate (second) cell 1924 has a low Verdet constant, in other embodiments this order may be reversed. More specifically, in an alternative implementation the fiber within the second cell 1924 may have a very high Verdet constant, while the fibers in the first and third magnetic cell 1922, 1926 may have very low Verdet constants or be associated with the direction of the Faraday rotation that is opposite to that of the fiber within the cell 1924. In such alternative implementation, the magnetic cells may have a larger diameter than what would be required for the embodiment illustrated in FIG. 19B because only one section of the magnet is causing the desired rotation.

In embodiments were the magnetic cells are oriented such that the same poles are facing each other, as in FIG. 19B, the magnetic cells can be either separated by a distance d or forced in direct contact (in contrast with the practical positioning of the magnetic cells of the embodiment of FIG. 19A discussed above). In the latter situation, because of the repulsion forces the magnets will need to be fixated into place using screws, adhesive materials, or other means. One advantage of the embodiment shown in FIG. 19B over the embodiment of FIG. 19A is that the spacing between the magnets can be made as small as possible. This close or direct contact can enhance the magnetic field in both of the connecting magnets. Moreover, the overall physical length of the resulting Faraday rotator will be smaller than that of the embodiment of FIG. 19A, which is advantageous in many applications.

While Faraday rotators 1900 and 1920 have each been illustrated with three magnetic cells, it will be appreciated that this is for clarity and is not meant to be limiting. In each embodiment fewer or more than three magnetic cells can be used. In embodiments where the magnetic cells are arranged so that the same magnetic poles face each other, such as with Faraday rotator 1920, it is preferable that an odd number of magnetic cells be used.

For the arrangement depicted in either FIG. 19A or 19B, while the magnetic cells have been depicted for clarity as having the same size and/or the same cross-sectional extent(s), this is not intended as a limitation. In certain embodiments, separate magnetic segments having different lengths or different cross-sectional diameter are used. Furthermore, the magnetic cells used may be of the same magnetic material or may be of different magnetic materials.

Figure 20:
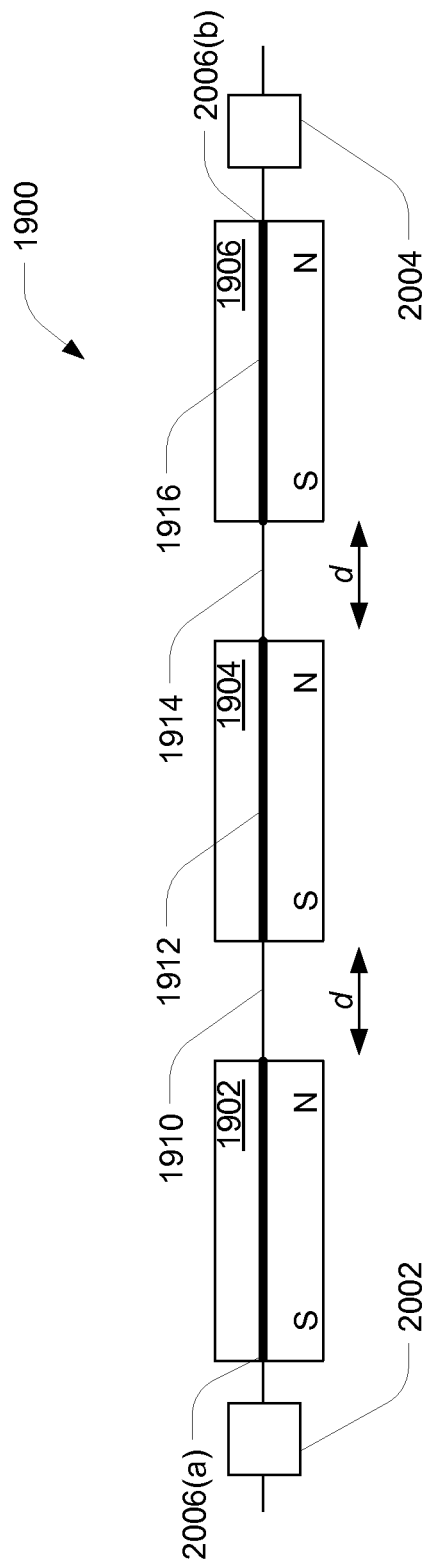
FIG. 20 is a schematic illustration of a Faraday isolator according to the present invention.

In certain embodiments, the ends of Faraday rotator 1900 or 1920 are further connected with a fiber-optic based polarizer to form a Faraday isolator. A schematic of such an embodiment using Faraday rotator 1900 is depicted in FIG. 20, wherein the fiber-optic based polarizer 2002 is connected to a first end of Faraday rotator 1900 and the fiber-optic based polarizer 2004 is connected to the other end thereof. As with the previously described embodiments, the ends of fiber optic components 1908 and 1916 are fusion-spliced with corresponding ends of the polarizers 2002 and 2004 (fiber-fusion splicing joints 2006(*a*) and 2006(*b*)), thereby creating an all fiber-optic based device.

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope. For example, embodiments implementing arrays of all-fiber-optic based isolators employing PM fiber-optic beam splitter/combiners can be readily configured for use with a plurality of laser sources (such as fiber lasers, for example) and fiber-optic amplifiers.

Figure 17A:
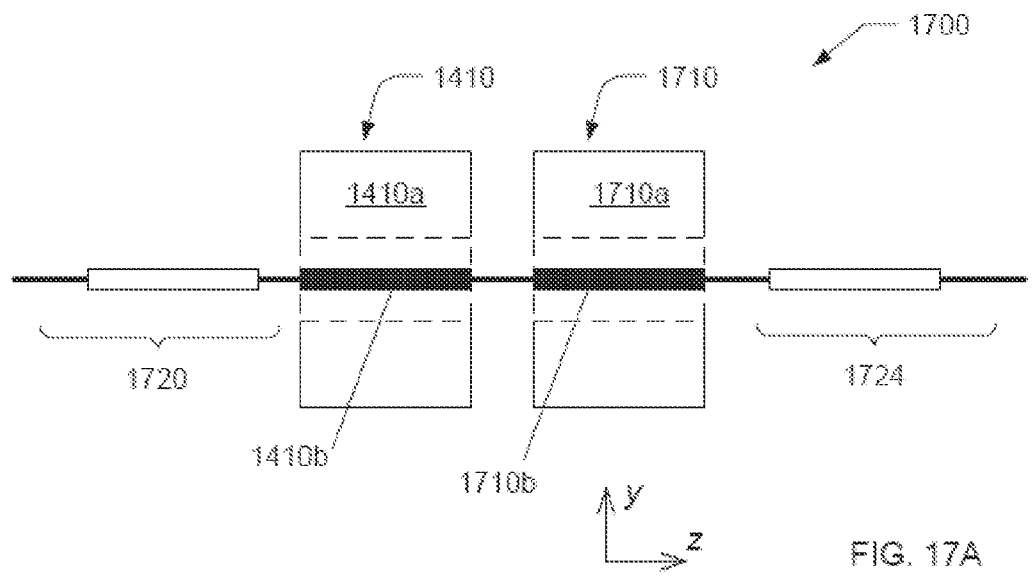
FIGS. 17A and 17B show schematically alternative embodiments of the present invention.
Figure 17B:
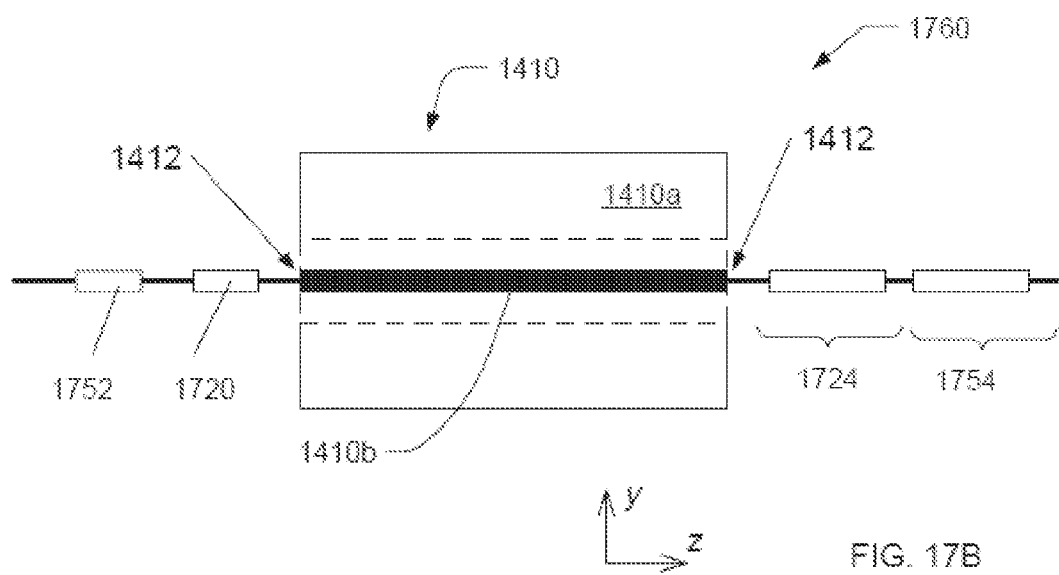

While the preferred embodiments of the present invention have been illustrated in detail, it should be apparent that modifications and adaptations to those embodiments may occur to one skilled in the art without departing from the scope of the present invention as set forth in the following claims. For example, an alternative embodiment of the invention may include multiple Faraday rotators 1410, 1710 (each of which contains a corresponding polarization-rotating fiber optic component 1410b, 1710b enclosed in a corresponding magnetic cell 1410a, 1710a). Alternatively or in addition, an embodiment of the invention may include multiple polarization-maintaining fiber-optic beam-splitter, arranged in sequence, or in parallel, or both sequentially and in parallel with one another. An example of a sequence of multiple PM fiber-optic beam-splitters 1720, 1752 and 1724, 1754 used with an embodiment 1760 is shown in FIGS. 17A and 17B.

What is claimed is:

1. A fiber-optic device having input and output and comprising:
   at least one pump laser source;
   at least one first rare-earth doped optical fiber having a material composition enabling amplification of light passing therethrough;
   at least one all-fiber optical isolator including a second optical fiber having at least first, second, and third separated from one another sections, the first and third sections of the second optical fiber being associated with Faraday rotation and having respective cores with a first doping concentration of 55% (wt./wt.) to 85% (wt./wt.) of a first rare-earth oxide, and
   at least three magnetic cells each having a hollow, said at least three magnetic cells arranged in a sequence such that the same magnetic poles of immediately neighboring cells are facing one another, said first and third sections of the second optical fiber respectively disposed in the hollows of first and third magnetic cells that are separated by a second magnetic cell,
   wherein the fiber-optic device is an all-fiber fiber-optic device and a light-path of the fiber-optic device defined between the input and the output is devoid of a free-space region, immediately neighboring fiber-optic elements of the fiber-optic device being fusion-spliced together,
   wherein the second optical fiber includes a cladding having a second doping concentration of 55%-85% (wt./wt.) of a second rare-earth oxide,
   and
   wherein the second rare-earth oxide is selected from the group consisting of Pr2O3, Nd2O3, Pm2O3, Sm2O3, Eu2O3, Gd2O3, Tb2O3, Dy2O3, Ho2O3, Er2O3, Tm2O3, Yb2O3, La2O3, Ga2O3, Ce2O3, and Lu2O3, and a refractive index of the cladding is lower than a refractive index of the core.

2. A fiber-optic device according to claim 1, wherein the second optical fiber includes a multicomponent glass optical fiber and the first rare-earth oxide is selected from the group consisting of Pr2O3, Nd2O3, Pm2O3, Sm2O3, Eu2O3, Gd2O3, Tb2O3, Dy2O3, Ho2O3, Er2O3, Tm2O3, Yb2O3, La2O3, Ga2O3, Ce2O3, and Lu2O3.

3. A fiber-optic device according to claim 1, adapted to generate a power output characterized by at least one of an average power in excess of 100 W or a peak power in excess of 5 kW.

4. A fiber-optic-device according to claim 1, adapted to generate a light output having single-mode characteristics or multi-mode spatial characteristics.

5. A fiber-optic device according to claim 1, structured to generate a light output with polychromatic spectral content.

6. A fiber-optic device according to claim 1, structured to generate a light output including at least one of a continuous-wave output and a pulsed output.

7. A fiber-optic device according to claim 6, wherein the light output includes a continuous-wave output and a pulsed output.

8. A fiber-optic device of claim 1,
wherein the first section of the second optical fiber, when exposed to a magnetic field flux density, is characterized by a first Faraday rotation angle and a first direction of Faraday rotation,
wherein the third section of the second optical fiber, when exposed to said magnetic field flux density, is characterized by a third Faraday rotation angle and a third direction of Faraday rotation, and
said first direction of Faraday rotation is the same to the third direction of Faraday rotation.

9. A fiber-optic device according to claim 1, wherein magnetic cells in a pair of immediately neighboring magnetic cells are axially separated from one another.

10. A fiber-optic device of claim 1, wherein each of the magnetic cells is in physical contact with at least one other of the magnetic cells.

11. A fiber-optic device according to claim 1, wherein sections of the second optical fiber associated with Faraday rotation and enclosed in different magnetic cells are different with respect to at least one of a corresponding doping material and a corresponding concentration of said doping material.

12. A fiber-optic device according to claim 1 having a first port and a second port, the fiber-optic device further comprising a first optical-fiber-based polarizer defining the first port and a second optical-fiber-based polarizer defining the second port.

* * * * *